INVENTORS
JOSEPH COHN
EUGENE COHN
BY
ATTORNEYS

INVENTORS
JOSEPH COHN
EUGENE COHN

INVENTORS
JOSEPH COHN
EUGENE COHN

United States Patent Office 3,236,718
Patented Feb. 22, 1966

3,236,718
METHOD OF TREATING WEBS AND PRODUCT RESULTING THEREFROM
Joseph Cohn, New York, and Eugene Cohn, Great Neck, N.Y., assignors to Samcoe Holding Corporation, Woodside, N.Y., a corporation of New York
Filed July 15, 1958, Ser. No. 748,643
13 Claims. (Cl. 161—128)

The present invention relates to the treatment of web materials, and is especially advantageous in connection with, although not necessarily limited to, so-called non-woven fabrics.

The term "non-woven" fabric, at least as used herein, refers to a fibrous web material, in which the fibers are laid in the form of a web (as distinguished from weaving or knitting a web) and are bonded together by the introduction of a suitable binder or by so-called regeneration of the fibers. When the fibers are bonded by regeneration, heat and/or chemical agencies are usually applied, so that individual fibers bond to one another. In addition, or as an alternative, the individual fibers may be held together by a binder, such as latex, for example, so that a coherent web material is formed.

The manufacture of non-woven web materials constitutes a potentially important phase of the textile industry, due to a number of advantageous factors, such as the low cost of manufacture, wide versatility in production techniques, and to certain advantageous characteristics of the web material. By way of example, the production of non-woven web material may be carried out on relatively simplified apparatus and in such a manner that, through the control of certain variables, the weight, strength, etc., of the material may be varied with substantial precision, and the produced fabric may have desirable patterns or artistic designs which are difficult to achieve with knitting and weaving equipment.

Notwithstanding the many advantages of non-woven web material, as a substitute for more conventional knitted and woven materials and also as a medium from which a variety of new products may be manufactured, the commercial acceptance of non-woven materials has been limited, due to certain undesirable physical characteristics of the material, such as lack of proper resilience, unsatisfactory hand or feel, and the like. Accordingly, the present invention provides a novel and improved method of treating web materials, and particularly non-woven web materials, to impart thereto unusual and highly desirable characteristics. The invention is also directed to the provision, as a new product, of a web material having the desired, unusual characteristics.

More specifically, the invention provides a novel and improved method for treating web material, whereby to provide, in the material, a series of crimps or pleats, of at least a semi-permanent nature, which not only impart substantial resilience or elasticity to the material, but also render the material soft and pleasant to the touch. In general, the new method comprises feeding the web material at a first speed toward a surface travelling at a slower speed, passing the material through a short deceleration zone, in which crimps or pleats are formed in the material, and immediately thereafter applying heat and pressure to the material to heat-set the crimps or pleats. Advantageously, the web material is formed in part of heat-settable fibers, of either a thermoplastic or thermosetting type, and/or the web includes a binder capable of being set by heat. In such cases, the crimps or pleats formed in the web material are of a permanent or semi-permanent nature, depending on whether the heat-settable substance in the web is thermosetting or thermoplastic.

Treatment of web materials, such as non-woven fabrics, in accordance with the new method results in substantial beneficiation of the material, in respect of certain of its physical characteristics. Thus, non-woven materials of an otherwise stiff and/or non-resilient nature are provided with substantial, desirable softness and elasticity when treated in accordance with the invention. By the way of example, and not of limitation, in certain non-woven fabrics the fibers are oriented generally lengthwise of the web, in which case the fabric exhibits very little lengthwise elasticity, although some widthwise elasticity may be present. After treatment in accordance with the new method, such a fabric is imbricate in structure and is rendered highly elastic, lengthwise, by the provision of closely spaced, semi-permanent crimps or pleats, which allow the fabric to be pulled out substantially, with the ability to return to its initial form when the tension is released.

For a better understanding of the invention, reference should be made to the following detailed description and to the accompanying drawings, in which.

Figure 1:
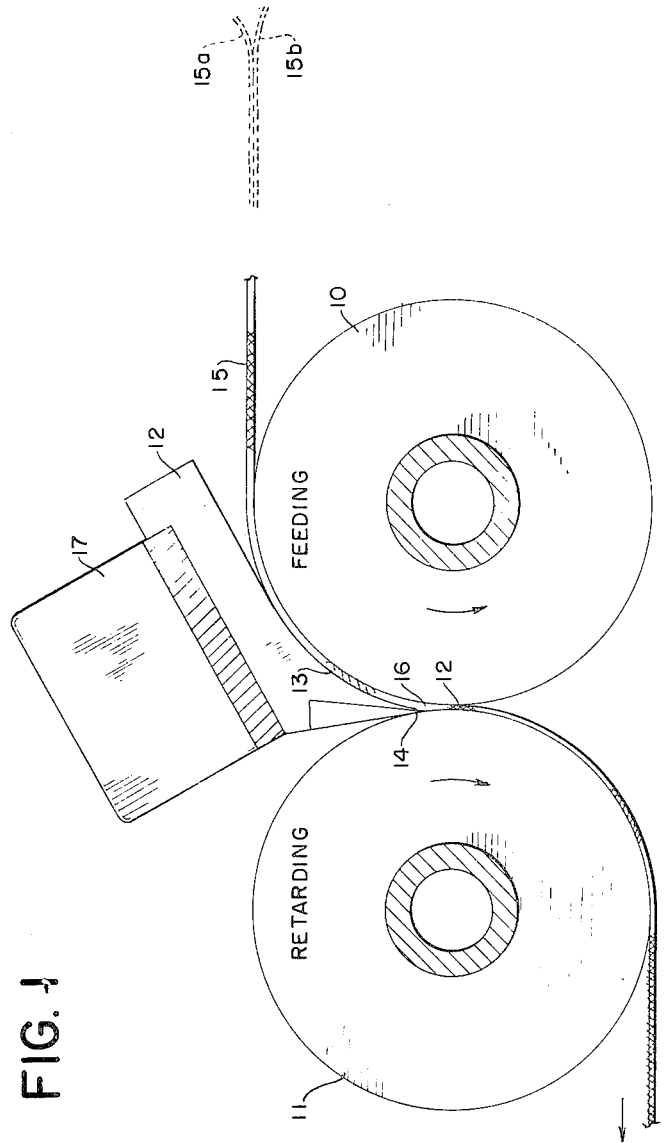
FIG. 1 is a simplified, schematic representation of an apparatus for carrying out the method of the invention.

Referring now to the drawings, the apparatus illustrated in FIG. 1 may be constructed in accordance with teachings of the co-pending applications of Eugene Cohn et al., Serial No. 638,154, filed February 4, 1957 for "Method and Apparatus of Treating Web Materials, Such as Fabrics," now United States Patent No. 3,015,145 and Serial No. 707,803, filed January 8, 1958, for "Method and Apparatus for Compacting Textile Fabrics," now United States Patent No. 3,015,146. The illustrated apparatus comprises a pair of rolls 10, 11 mounted for rotation about parallel axes and advantageously adjustable toward and away from each other to form a nip N of desired dimensions. The roll 10 constitutes a feeding roll, and is adapted to be driven at a predetermined, adjustable speed. The roll 11 constitutes a retarding roll, and is also adapted to be driven at a predetermined, adjustable speed, which is somewhat slower than that of the feeding roll. A material confining shoe 12 is mounted in predetermined, adjustable relation to the feeding and retarding rolls and has an arcuate lower surface 13, which is advantageously substantially concentric with the outer surface of the feeding roll 10. The shoe 12 has a terminating edge 14, which is positioned between the feeding and retarding rolls, a predetermined, adjustable distance above the nip N, the nip being considered to lie in the plane containing the axes of the rolls 10, 11.

In accordance with the teachings of the beforementioned co-pending applications, web material 15 is fed (in single or multiple layers) toward the nip N by passing the material between the feeding roll 10 and the arcuate surface 13 of the shoe 12. The shoe 12 confines the web 15 against the feeding roll, in the absence of substantial localized pressure on the web, so that the material is fed at the peripheral speed of the feeding roll into a treating zone 16 defined by the terminating edge 14 of the shoe and by the nip N. The retarding roll 11, which has a peripheral speed less than that of the feeding roll 10, is provided with a surface, such as a lightly knurled and/or mildly etched surface, which grips the web material with greater frictional force than does the feeding roll 10, at the nip N. Accordingly, in the zone 16, the material is decelerated from the peripheral speed of the feeding roll to the peripheral speed of the retarding roll.

In accordance with the present invention, the relative peripheral speeds of the feeding and retarding rolls and/or the length of the treating zone 16, measured in the direction of web movement, is such that the web material, entering the zone at a greater rate of speed than it leaves the zone, upsets or folds and forms spaced crimps or pleats. In this respect, the terms "crimps," "pleats," "crimping," "pleating," etc., are not intended to be technical or limiting, but only descriptive. Thus, the beforementioned terms include "creping," etc., where a surface irregularity is produced.

The crimps or pleats, formed in the web material during its passage through the zone 16, are rendered at least semi-permanent by the application of heat and pressure to the web material at the roll nip N. To this end, the shoe 12 may be provided with suitable means, such as resistance heating unit 17, for pre-heating the material moving toward the nip, while the feeding and retarding rolls 10, 11 may be of hollow construction, to receive steam or other heating medium, whereby further heat, as well as localized pressure, is applied to the material as it passes through the nip.

In accordance with one specific aspect of the invention, the web material 15 contains a heat-settable substance, which may take the form of heat-settable, plastic fibers and/or of a heat-settable binder material, whereby the crimped or pleated web, when subjected to appropriate heat and pressure, takes on a permanent or semi-permanent set, depending upon whether the heat-settable substances are of a thermosetting or thermoplastic nature. In this respect, although heating of the shoe 12 is highly desirable, as tending to reduce the friction between the moving web 15 and the stationary shoe, the more important heating phase is at the nip N, where the material is confined under pressure between the feeding and retarding rolls. The appropriate temperatures for the rolls will, of course, vary somewhat, depending greatly upon the thermal properties of the heat-settable material as well as upon heat transfer characteristics. The proper roll temperature may be determined without difficulty, by empirical means, when the nature of the specific web material is known.

By way of example, and not of limitation, a web material formed entirely of or having a substantial portion of viscose rayon fibers may be treated in accordance with the invention to form a plurality of spaced crimps or pleats therein, which are rendered semi-permanent by the application, at the nip N, of substantial localized pressure and of sufficient heat to render the viscose material substantially thermoplastic. When the heat is removed, the viscose material will retain the set imparted thereto by the rolls 10, 11 until, at some subsequent time, the web material is re-heated to return the heat-settable substances of a thermoplastic state.

Figure 2:
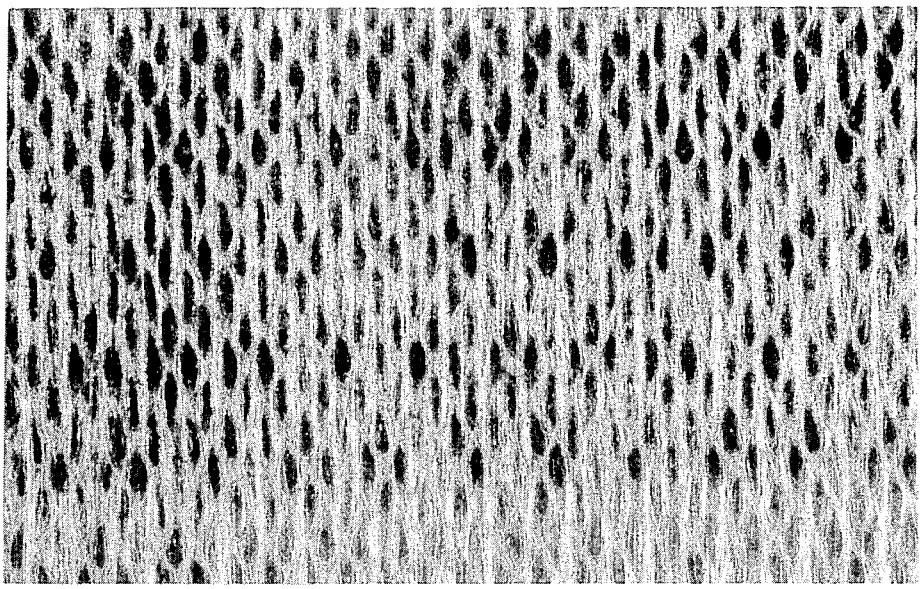
FIGS. 2 and 3 are enlarged photographic representations of the top and bottom surfaces of a typical non-woven fabric having a mesh pattern.
Figure 3:

Referring now to FIGS. 2 and 3, there is shown by photographic representation a typical, non-woven fabric, which may be formed with a substantially diamond pattern, using viscose rayon fibers. While it is not material to the present invention, a fabric or web material, such as shown in FIGS. 2 and 3, may be manufactured by depositing on a moving belt a plurality of layers of carded, oriented fibers, which are then directed through a forming station, in which the web is held against a drum by a porous blanket. Water, under high pressure, is directed through the drum and passes through patterned formations in the blanket, to separate portions of the web fibers and thereby form the desired pattern (diamond or otherwise) in the web. The web then may be passed to a wet-out and print station, in which an agent, such as sulfuric acid, is printed on the fibers to effect bonding thereof in desired areas. The web thus formed is dried, after which it may be wound or otherwise handled for further processing.

Figure 4:
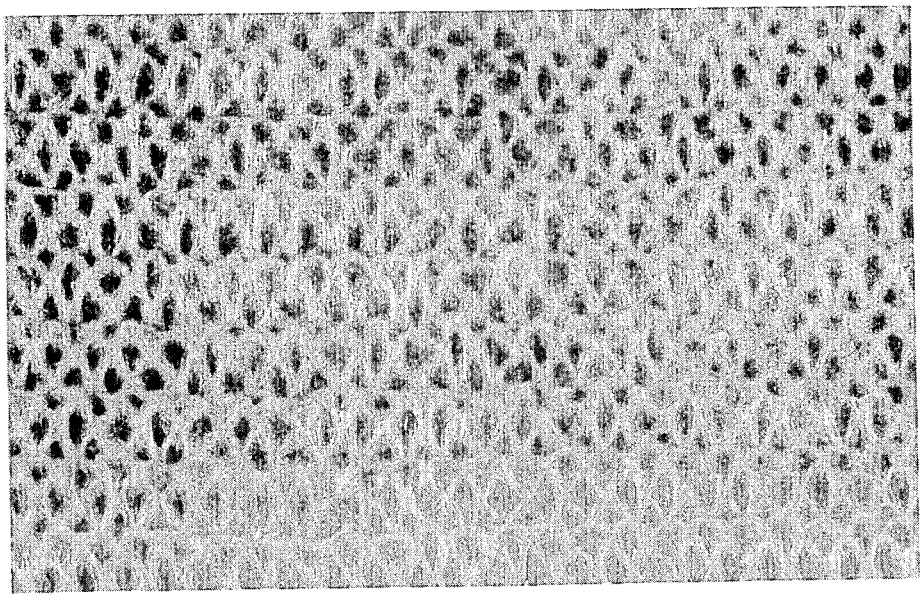
FIGS. 4 and 5 are enlarged photographic representations of top and bottom surfaces of the non-woven fabric shown in FIGS. 2 and 3, illustrating the fabric after treatment in accordance with the invention.
Figure 5:
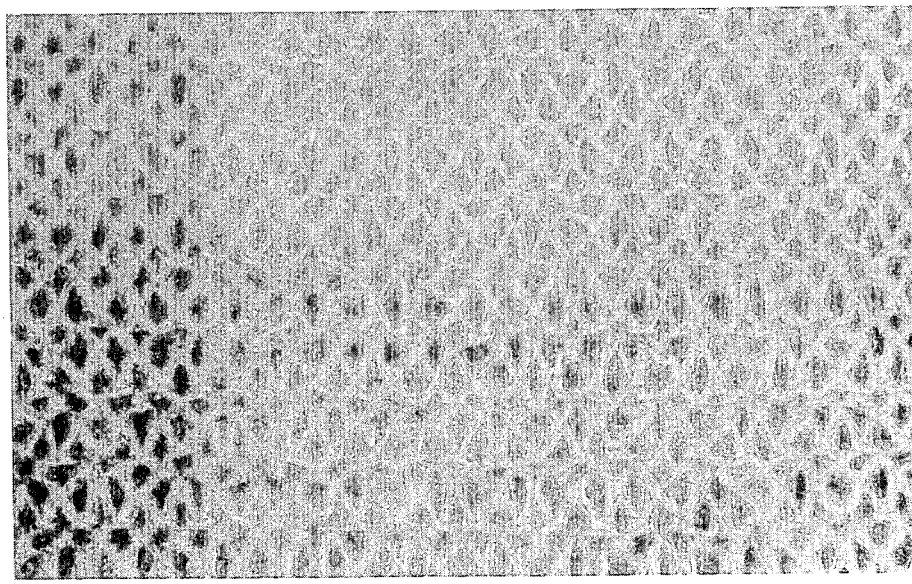

When the web material illustrated in FIGS. 2 and 3 is treated in accordance with the new method, by directing the web through the treating zone 16 to form closely spaced rows of crimps or pleats, and semi-permanently setting the pleats by the application of heat and pressure in the roll nip N, an imbricate web material is formed, which has a surface appearance substantially as represented in FIGS. 4 and 5. Thus, portions of the web are folded over and crimped or pleated, so that the surfaces of the web material have a shingled appearance. Advantageously, the heat and pressure applied to the material during the treatment are such that the fibers are set while in a thermoplastic state, to achieve semi-permanency of the imbricate structure. Setting under conditions of thermoplasticity is not known to be necessary, although it is considered to be highly advantageous.

Solely by way of example, the fabric represented by the photographs of FIGS. 2–5 is a 650 grain (per square yard) open or foraminous fabric having, after treatment, relatively uniformly spaced crimps or pleats about ⅛ inch apart.

Figure 6:
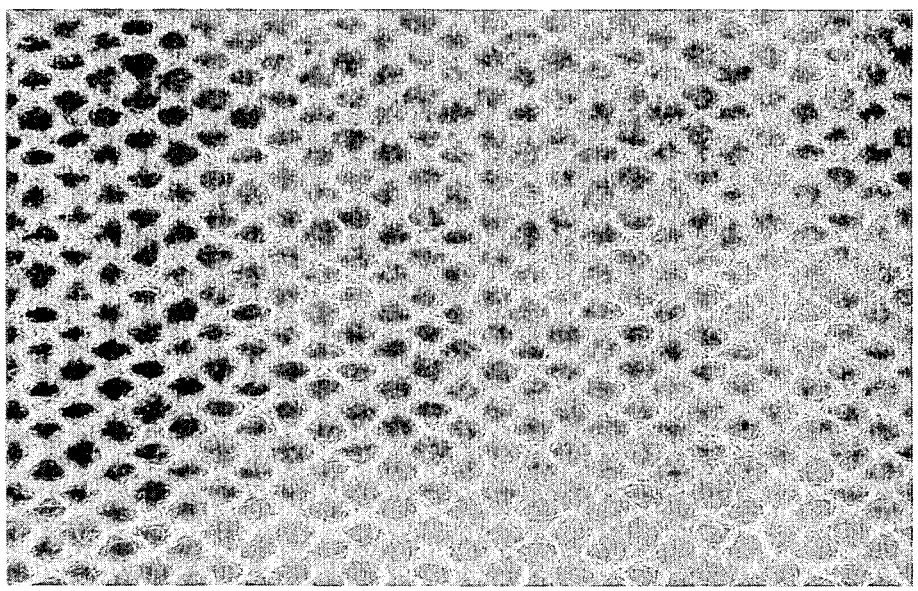
FIGS. 6 and 7 are enlarged photographic representations of the top and bottom surfaces of a second type of non-woven fabric having a mesh pattern.
Figure 7:
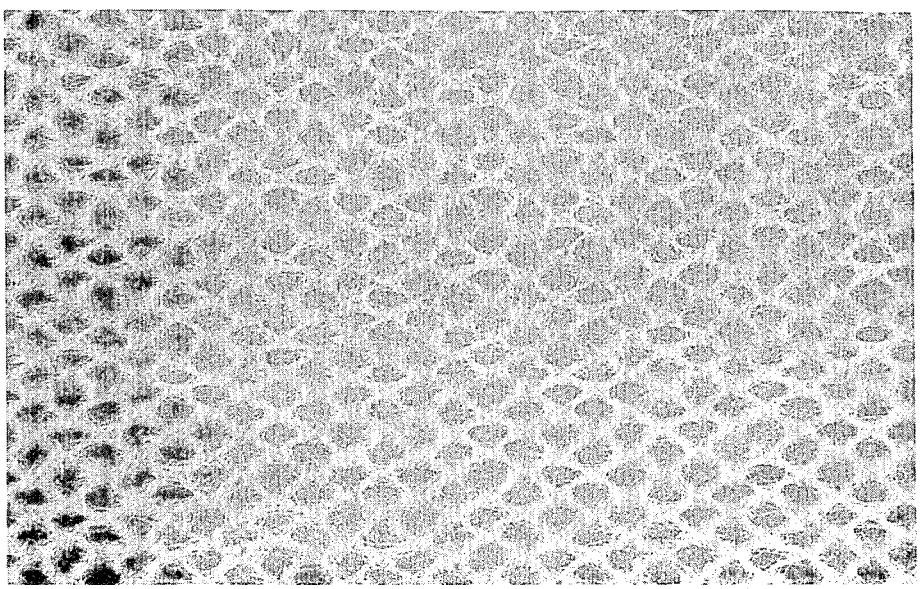
Figure 8:
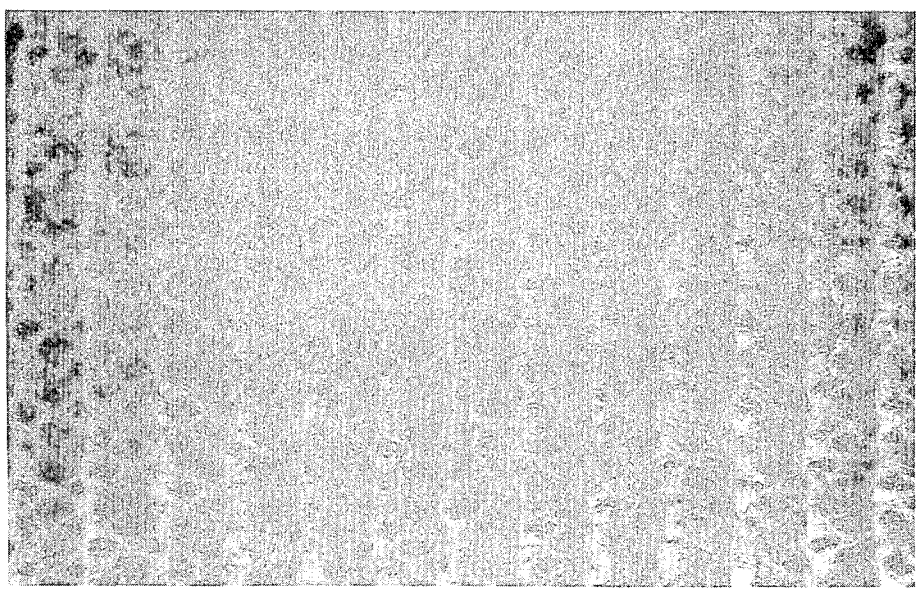
FIGS. 8 and 9 are enlarged photographic representations of top and bottom surfaces of the non-woven fabric shown in FIGS. 6 and 7, illustrating the fabric after treatment in accordance with the invention.
Figure 9:
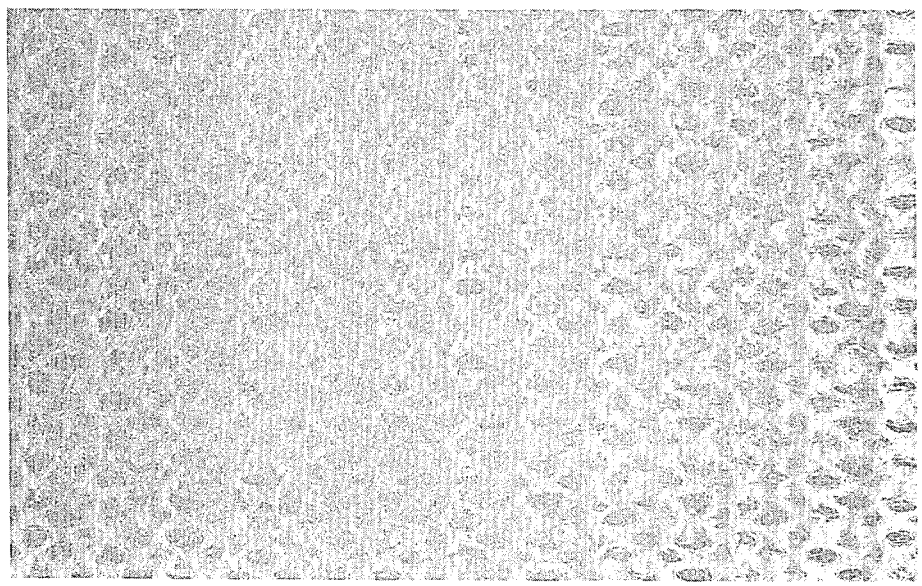

The fabric of FIGS 6–12 is similar to that of FIGS. 2–5 but has a slightly different pattern. Untreated fabric is shown in FIGS 6 and 7, while the treated fabric is shown in FIGS. 8–12.

The photographic representations of FIGS. 2–11 are based on photographs made by laying a light colored material upon a flat block and making an exposure from directly above the block, or directly toward the flat surface of the material. For the representation of FIG. 12, the exposure was made along an edge of the block to illustrate surface profile. In all cases, a black sheet was laid below the fabric to heighten contrast.

The untreated material represented by FIGS. 2 and 3 and FIGS. 6 and 7 is thin and flat, and has good strength and rigidity in the direction that follows, generally, the lengthwise-lying fibers, or horizontally in the figures. The fabric is extensible, somewhat, in the crosswise direction (vertically in the figures) but, as the fabric is extended, the fibers can be felt to slip over one another and the fabric stays substantially at the width to which it is stretched. Also it will be noted that the untreated fabric is similar in appearance on its opposite surfaces.

The treated fabric, shown in FIGS. 4, 5 and 8–12, is distinctly two sided; that is, the opposite surfaces of the fabric have different appearance occasioned, probably, from the fact that the fabric, in passing through the nip N, is in simultaneous contact with surfaces moving at different speeds. The treated fabric is imbricate in form, having regularly spaced "ridges" and "valleys," which provide a distinct, shingled appearance. The ridges increase the effective thickness of the fabric and impart thereto substantial elasticity in the lengthwise direction. However, the stretch characteristics of the fabric in a crosswise direction remain substantially the same, after treatment, as before, the fabric being capable of some stretch, but without the ability to return.

Figure 14:
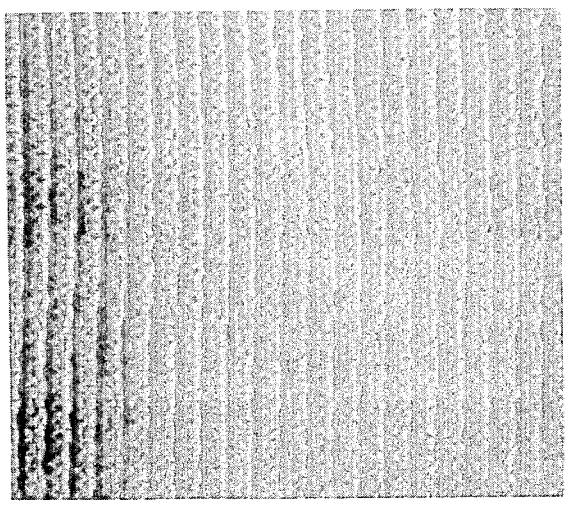

As is perhaps most apparent in FIG. 14, the illustrated, treated fabric closely resembles coarse knit or crocheted fabric. The ridges, for example, extending transversely of the web, have the general appearance of wales in a knit fabric.

Figure 10:
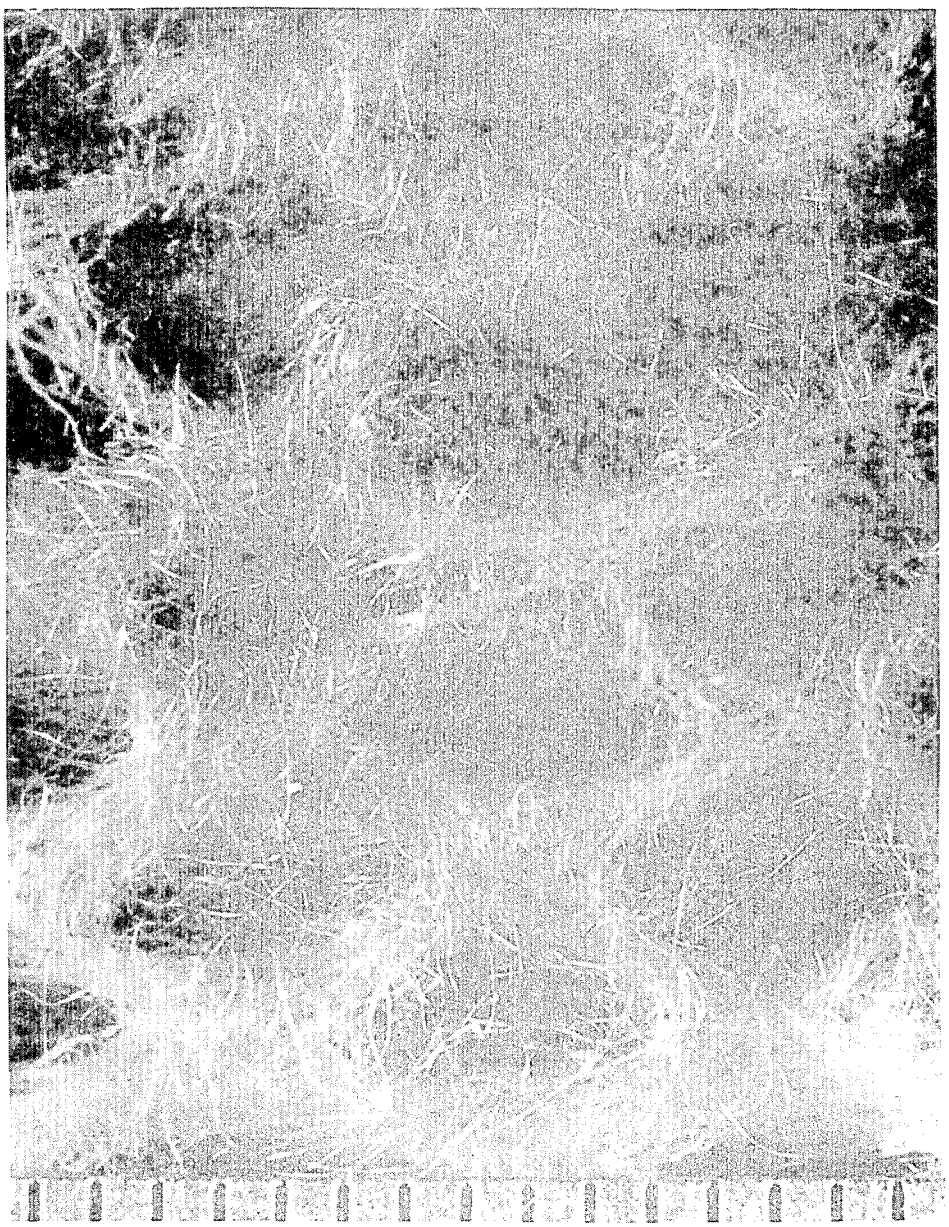
FIGS. 10 and 11 are greatly enlarged photographic representations of the treated fabric shown in FIGS. 8 and 9.
Figure 11:
Figure 12:
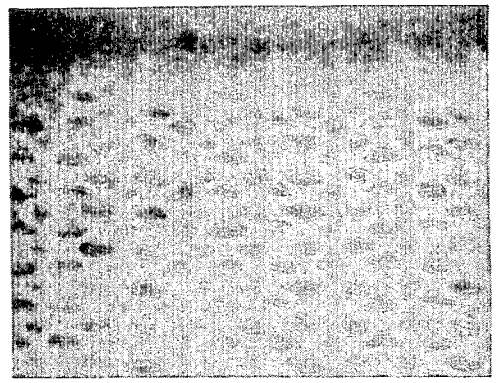
FIG. 12 is a photographic representation of the fabric of FIGS. 8 and 9, illustrating the surface profile of one side of the fabric.
Figure 13:
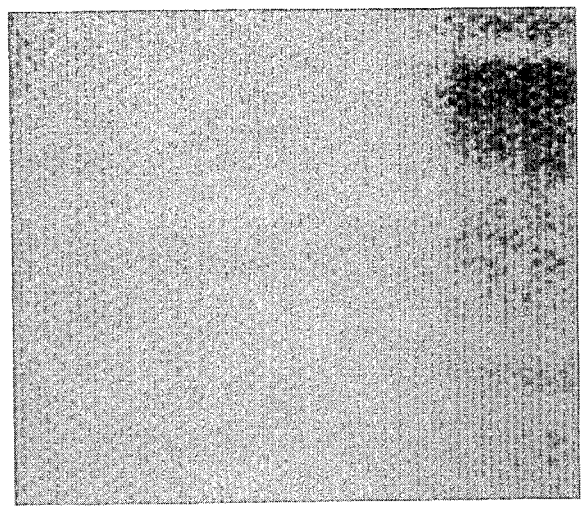
FIGS. 13 and 14 are photographic representations, on a smaller scale, of one surface of the fabric such as shown in FIGS. 2–12, illustrating the fabric before and after treatment in accordance with the invention.

Structural characteristics of the illustrated, treated fabric are best indicated in FIGS. 10, 11, in which the fabric is represented against a scale having divisions spaced 1/64 inch apart. Thus, in FIG. 11, a ridge is shown extending vertically, to the right of center. The individual fibers of the material appear to be bunched together and curled somewhat at the ridge, while retaining their original general form in the valleys between ridges. The openings in the fabric, which were originally fairly uniform in size and shape, have become irregular, as viewed close up, although relatively little change in the overall hole pattern is apparent when the fabric is viewed from greater distances.

The treated fabric exhibits marked improvement in softness and feel resulting, probably, from the increased effective thickness of the material, as well as its greater elasticity. This is an important result of the new method and an important characteristic of the new product, particularly in respect of non-woven fabrics which, in untreated form, are frequently stiff and unpleasant to the touch.

Figure 15:
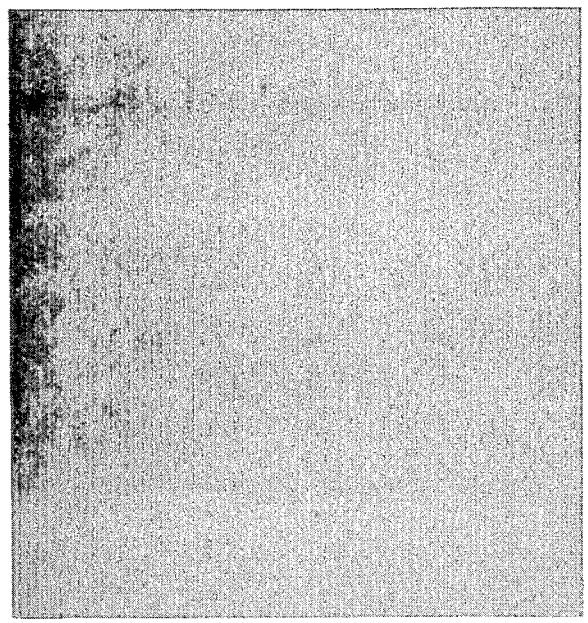
FIGS. 15 and 16 are photographic representations of a random oriented, non-woven fabric, illustrating the fabric before and after treatment in accordance with the invention.

FIG. 15 illustrates a so-called isotropic, non-woven material, in which the fibers making up the web are oriented in a wholly random manner, so as to impart substantially equal strength to the web in all directions in the plane of the web. The sample fabric represented by FIG. 15 was a dense web, in which the individual fibers were held together by the addition of a binder, which imparted substantial stiffness to the web. The web, in its initial form, had little resilience in any direction.

Figure 16:
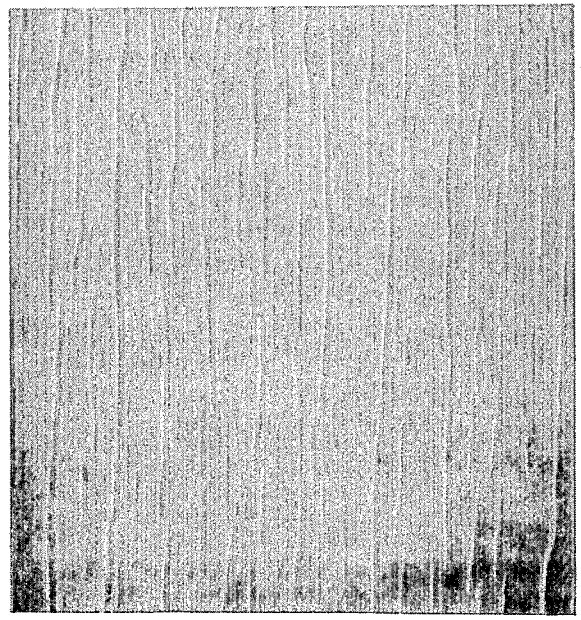

After treatment in accordance with the invention, the web material of FIG. 15 appeared substantially as illustrated in FIG. 16, having a plurality of closely spaced crimps or pleats extending transversely of the web. The nature, disposition and spacing of the crimps or pleats in the fabric of FIG. 16 is somewhat less uniform than that of the previously described fabrics, which is apparently the result of the substantial stiffness of the untreated web material. After treatment, the material exhibited substantially improved elasticity in directions longitudinal of the web, and the elasticity was substantially unaffected by the application of sufficient tension to draw the crimps or pleats out flat.

In some cases, and particularly in connection with the processing of certain light weight, non-woven fabrics, the starting material or untreated fabric is of such small thickness as not to lend itself to convenient processing as a single web. For example, a non-woven fabric may occasionally have a thickness of about 0.002 inch, in which case it is difficult to treat the material effectively without special apparatus. Accordingly, such thin web materials may be treated in multiple layers, as by superimposing one web upon another and passing both, simultaneously, through the treating apparatus. A pair of webs 15a, 15b superimposed for this purpose are illustrated in phantom lines in FIG. 1.

The foregoing specific illustrations of web material are intended to be representative only, as the web materials which may be usefully treated in accordance with the new method are many and varied. The new method, while not necessarily thus limited, is particularly useful and advantageous in connection with the treatment of non-woven fabric, since there are thereby imparted to the fabric desirable physical characteristics, such as resilience, softness, elasticity, etc., which have been difficult, if not impossible, of obtainment heretofore. Thus, non-woven fabrics, which are known to be commercially desirable from the standpoint of ease and economy of manufacture, may be treated in a simple, economical manner, resulting in substantial beneficiation of the material for many end uses.

A web material, particularly a non-woven fabric, treated in accordance with the new method, constitutes a wholly new intermediate material, from which a large variety of end products may be made. Thus, and by way of example only, the characteristics of softness, elasticity, unique appearance, etc., imparted to the web material render it suitable for such end products as clothing, draperies, etc. And, in this respect, the total manufacturing cost of such materials, including the cost of treatment in accordance with the invention, is sufficiently low that end products such as clothing, draperies, napkins, etc., may be of a single use or disposable nature.

It should be understood that the method and products specifically described herein are intended to be illustrative only, and reference should be made to the following appended claims in determining the full scope of the invention.

We claim:

1. The method of treating non-woven fibrous web material having therein a heat-settable substance, which comprises feeding a web of said material at a first speed toward a surface travelling at a second and slower speed, passing said material through a deceleration zone of predetermined length immediately prior to bringing said material into contact with said surface, said first and second speeds being such, in relation to the length of said zone, as to cause crimps or pleats to be formed in said web material, and applying heat and rolling pressure to opposed principal surfaces of said material as it leaves said zone of deceleration, the heat and pressure applied to said material being sufficient, relative to the material and the heat-settable substance, to effect at least a semi-permanent set of the crimps or pleats in the material, whereby the treated material assumes at least a semi-permanent imbricate appearance and has substantial elasticity in the longitudinal direction.

2. The method of claim 1, in which said material includes a substantial portion of fibers formed of thermosetting material, and the heat and pressure are sufficient to effect a substantially permanent set of the thermosetting fibers.

3. The method of claim 1, in which said material includes a substantial portion of fibers formed of thermoplastic material, and the heat and pressure are sufficient to effect a semi-permanent set in the thermoplastic fibers.

4. The method of claim 1, in which said material includes a heat-settable binder, and the heat and pressure are sufficient to effect setting of said binder.

5. The method of claim 1, in which one web of material is superimposed on another, and the superimposed webs are treated simultaneously.

6. The method of treating fibrous fabric web materials including a heat settable substance to improve the physical characteristics thereof, which comprises the steps of feeding a fibrous fabric web at a first predetermined feeding speed toward a retarding surface, passing said material through a deceleration zone immediately prior to bringing said material into contact with said retarding surface, said first feeding speed in relation to said retarding surface and to the length of said deceleration zone being sufficient to cause crimps or pleats to be formed in said web material, and applying heat and pressure to opposed principal surfaces of said material as it leaves said zone of deceleration to effect at least semi-permanent setting of said crimps or pleats.

7. As a new product, an imbricate, substantially elastic, non-woven fibrous fabric web material having a plurality of spaced, at least semi-permanently heat-set crimps or pleats.

8. A web material according to claim 7, which includes a heat-settable substance, and the crimps or pleats are held in at least semi-permanent set by said substance.

9. A web material according to claim 8, in which said substance comprises heat-settable fibers.

10. A web material according to claim 8, in which said substance comprises a heat-settable binder.

11. As a new product, a substantially elastic, non-woven fibrous fabric web material comprising, at least in part, a heat-settable substance, and having a plurality of at least semi-permanently set crimps or pleats, said material being of imbricate appearance and having substantial elasticity in the longitudinal direction.

12. A web material according to claim 11, in which the web material is foraminous in nature.

13. A web material according to claim 11, in which the pleats are in the form of ridges, and the individual fibers have the appearance of being bunched together and curled at the ridges.

References Cited by the Examiner

UNITED STATES PATENTS

| | | | |
|---|---|---|---|
| 1,012,914 | 12/1911 | Ratignier et al. | 26—69 |
| 1,180,828 | 5/1916 | Crane | 154—31 |
| 2,153,374 | 4/1939 | Kantor | 156—341 |
| 2,263,712 | 11/1941 | Wrigley et al. | 26—18.6 |
| 2,279,366 | 4/1942 | Childs | 156—341 |
| 2,343,930 | 3/1944 | Rowe | 154—33.05 |
| 2,357,392 | 9/1944 | Francis | 154—101.05 |
| 2,399,256 | 4/1946 | Rowe | 154—33.05 |
| 2,573,773 | 11/1951 | Rowe | 154—33.05 |
| 2,623,572 | 12/1952 | Haas | 154—30 |
| 2,765,513 | 10/1956 | Walton | 26—18.6 |
| 2,765,514 | 10/1956 | Walton | 26—18.6 |
| 2,768,092 | 10/1956 | Lawrence | 26—18.6 |
| 2,862,251 | 12/1958 | Kalwaites | 154—46 |
| 3,015,145 | 1/1962 | Cohn et al. | 26—18.6 |
| 3,015,146 | 1/1962 | Cohn et al. | 26—18.6 |

EARL M. BERGERT, *Primary Examiner.*

R. LEIBOWITZ, CARL F. KRAFFT, *Examiners.*